Oct. 19, 1954  T. H. DANIEL  2,691,841
FLEXIBLE INFLATED FISH LURE
Filed Jan. 25, 1952

INVENTOR
THOMAS H. DANIEL

BY
McMorrow, Berman & Davidson
ATTORNEYS

Patented Oct. 19, 1954

2,691,841

UNITED STATES PATENT OFFICE 2,691,841

FLEXIBLE INFLATED FISH LURE

Thomas H. Daniel, Rombauer, Mo.

Application January 25, 1952, Serial No. 268,155

2 Claims. (Cl. 43—42.06)

This invention relates to fish lures and more particularly to a hollow, flexible lure which is inflated by water passing therethrough when the lure is in use.

It is among the objects of the invention to provide an improved fish lure in the form of a hollow body of flexible or elastic material which is provided with water inlet and outlet openings and is inflated and given life-like movement by the passage of water therethrough during use; which closely simulates the appearance of an aquatic creature, such as a small fish or minnow; which is easily attached to a fishing line by it being mounted directly on line attached fishhooks; which may include a buoyant body or formation for maintaining the lure in upright position in the water; which does not tend to become fouled on underwater objects, such as logs, sticks and weeds, and also constitutes an antifouling guard for the hooks associated therewith; and which is simple and durable in construction, economical to manufacture, easy to use, and neat and attractive in appearance.

Other objects and advantages will become apparent from a consideration of the following description and the appended claims in conjunction with the accompanying drawing, wherein:

Figure 1:
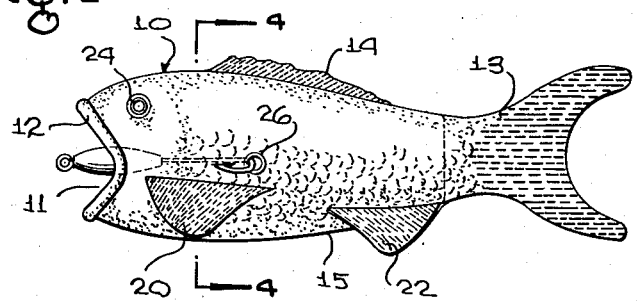
Figure 1 is a side elevational view of a fish lure illustrative of the invention.

With continued reference to the drawing, the lure comprises a hollow body, generally indicated at 10, of thin walled construction and formed in one piece from readily moldable, flexible or elastic material to simulate an aquatic creature, such as a small fish or minnow.

The body 10 has at one end an enlarged opening 11 simulating a mouth and providing a water inlet opening. This opening 11 is surrounded by a reinforcing bead 12, preferably of substantially circular cross sectional shape and molded integrally with the body 10, to maintain the inlet opening 11 open while the lure is being pulled or dragged through the water. At its other end the body is provided with a tail formation 13 and is of somewhat elliptical cross sectional shape having an upper or spinal edge provided with a dorsal fin formation 14 and a bottom or belly edge 15. The tail formation 13 is medially divided along a plane which includes the dosal and belly edges of the body to provide two superposed parts 16 and 17 of similar shape. The division between the parts 16 and 17 entering the interior of the body 10 at the front or proximal end of the tail formation to provide a water outlet opening 18 of lesser capacity than the water inlet opening 11.

The body 10 is also provided with external pectoral fin formations 19 and 20 and pelvic or anal fin formations 21 and 22. All of the fin formations taper in thickness in a direction away from the outer surface of the lure body, so that the fins move in a life-like manner when the lure is moved through the water. The fins may, however, be stamped or molded directly onto the body, if desired, without in any way exceeding the scope of the invention.

The body is also provided with simulated eyes 23 and 24 adjacent the spinal edge of the body and the inlet or mouth opening 11 and is provided adjacent its mid-length location with reinforced apertures or eyelets 25 and 26 disposed one in each side of the body and intermediate the width thereof between the spinal and belly edges of the body.

Figure 2:
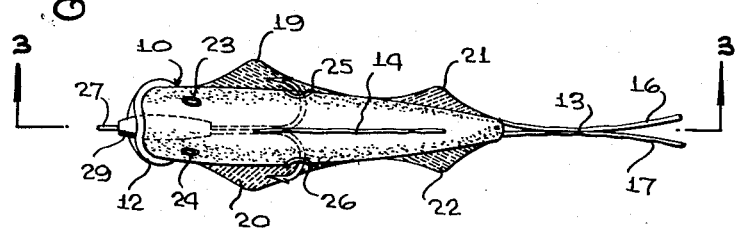
Figure 2 is a top plan view of the lure illustrated in Figure 1.
Figure 3:
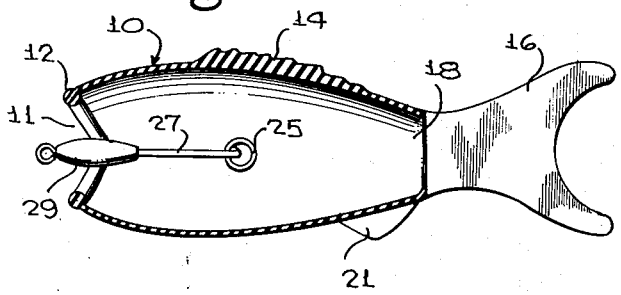
Figure 3 is a longitudinal cross sectional view on the line 3—3 of Figure 2.
Figure 4:
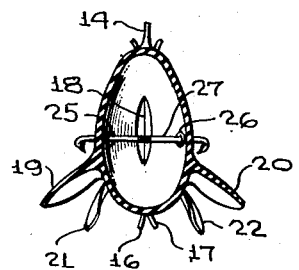
Figure 4 is a transverse cross sectional view on the line 4—4 of Figure 1.
Figure 5:
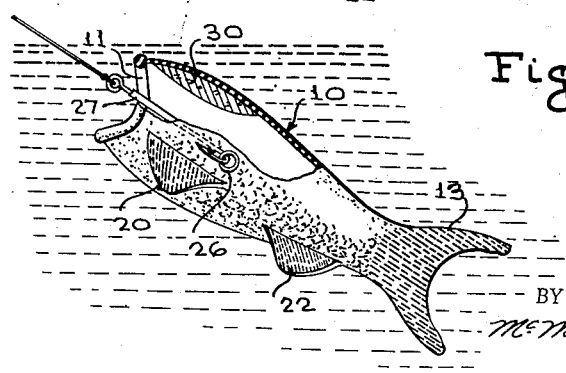
Figure 5 is a side elevational view of a somewhat modified form of lure with a portion broken away and shown in cross section to better illustrate the construction thereof.

A double fishhook 27 has its shank portion extending through the inlet opening 11 of the lure body and its hooks extending one through each of the eyelets 25 and 26 with the pointed and barbed ends of the hooks disposed at the other side of the body adjacent the corresponding eyelets, as is clearly illustrated in Figures 1 and 2. If desired, a sinker 29 may be mounted on the shank of the hook 27 and disposed partly or entirely within the lure body when the hook is engaged in the eyelets 25 and 26, as illustrated. The sinker may, however, be mounted at some other location along the fishline, if desired, without in any way exceeding the scope of the invention.

If desired, a body 30 of buoyant material, such as cork, may be secured in the lure body 10 at the upper or spinal edge of the body and adjacent the inlet opening 11 thereof, or a buoyant formation, such as an air pocket, may be formed in the body at this location to maintain the lure in upright position in the water.

When the lure is drawn through the water, as by reeling in a fishing line after a cast, the water inlet opening remains open and the water flows through this opening into the hollow lure body and out through the water outlet opening 18, the restriction of the outlet opening causing the body to move in a life-like manner as it is drawn through the water. Some water will flow out through the eyelets 25 and 26 creating a slight turbulence to conceal the presence of the hooks at this location.

The lure body is preferably formed of a suitable flexible or elastic material, such as thin, tough rubber and, because of its generally streamlined shape, has no tendency to become fouled in underwater objects. The stiffened front end of the lure body also constitutes the body and antifouling guard for the hooks on which the body is mounted.

The lure body can be quickly and easily attached to a fishing line by inserting the points of a double hook secured to the line through the eyelets 25 and 26 in the body, no other attachment between the lure and the fishing line being necessary.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fish lure comprising a thin walled hollow body of flexible material and of one-piece construction having at one end a water inlet opening surrounded by a reinforcing bead and at its other end a tail simulating formation medially separated into two superposed flexible parts to provide a water outlet opening extending from the interior of said body between said parts, said body also having fin formations at spaced apart locations thereon and reinforced apertures disposed intermediate the ends at each side thereof, and hooks extending through said water inlet opening and one through each of said apertures with their pointed ends at the outer side of said body adjacent said apertures, said water outlet opening having a smaller capacity than said water inlet opening to provide life-like movements of said body by the restricted flow of water through said outlet opening and between said tail simulating parts.

2. A fish lure comprising a thin walled hollow body of flexible material and of one-piece construction having at one end a water inlet opening surrounded by a reinforcing bead and at its other end a tail simulating formation medially separated into two superposed flexible parts to provide a water outlet opening extending from the interior of said body between said parts, said body also having fin formations at spaced apart locations thereon and reinforced apertures disposed intermediate the ends at each side thereof, hooks extending through said water inlet opening and one through each of said apertures with their pointed ends at the outer side of said body adjacent said apertures, said body being of elliptical cross sectional shape and having a spinal edge and a belly edge, and a body of buoyant material disposed in said body at the spinal edge thereof and adjacent said water inlet opening to hold said body in upright position in water.

References Cited in the file of this patent

UNITED STATES PATENTS

| Number | Name | Date |
| --- | --- | --- |
| 827,757 | Shakespeare | Aug. 7, 1906 |
| 1,368,939 | Kelly | Feb. 15, 1921 |
| 1,611,117 | Kearns | Dec. 14, 1926 |
| 1,771,587 | Shogren | July 29, 1930 |
| 2,027,069 | Sorenson | Jan. 7, 1936 |
| 2,106,370 | Bryan | Jan. 25, 1938 |
| 2,172,889 | Niemi | Sept. 12, 1939 |
| 2,261,549 | Hayes | Nov. 4, 1941 |
| 2,556,683 | Deitz | June 12, 1951 |
| 2,590,461 | Rasch | Mar. 25, 1952 |
| 2,600,314 | Miner | June 10, 1952 |

FOREIGN PATENTS

| Number | Country | Date |
| --- | --- | --- |
| 166,323 | Great Britain | July 8, 1921 |
| 168,427 | Great Britain | Sept. 5, 1921 |